United States Patent
Ross (10) Patent No.: US 7,047,758 B2
(45) Date of Patent: May 23, 2006

(54) ICE CREAM MACHINE WITH SPECIALIZED MOTOR

(75) Inventor: Harold F. Ross, Bark River, MI (US)

(73) Assignee: Ross's Manufacturing, LLC, Escanaba, MI (US)

( * ) Notice: Subject to any disclaimer, the term of this patent is extended or adjusted under 35 U.S.C. 154(b) by 63 days.

(21) Appl. No.: 10/686,017

(22) Filed: Oct. 15, 2003

(65) Prior Publication Data

US 2005/0081554 A1 Apr. 21, 2005

(51) Int. Cl.
*A23G 9/12* (2006.01)
(52) U.S. Cl. ......................... 62/342; 366/285
(58) Field of Classification Search ................. 62/342, 62/343; 366/279–286
See application file for complete search history.

(56) References Cited

U.S. PATENT DOCUMENTS

| 967,503 | A | | 8/1910 | Davis |
| 1,449,623 | A | * | 3/1923 | Pfouts ........................ 366/143 |
| 1,698,941 | A | | 1/1929 | Davenport |
| 1,767,857 | A | | 6/1930 | Sawyer |
| 1,769,113 | A | | 7/1930 | Davenport |
| 1,791,041 | A | | 2/1931 | Sawyer |
| 1,818,364 | A | | 8/1931 | Turnbow |
| 1,907,641 | A | | 5/1933 | Askin |
| 1,911,464 | A | | 5/1933 | Pearson |
| 2,070,729 | A | | 2/1937 | Harsch et al. |
| 2,156,096 | A | | 4/1939 | Robinson |
| 2,239,165 | A | * | 4/1941 | Adams ........................ 426/565 |
| 2,349,367 | A | | 5/1944 | Muffly |
| 2,515,722 | A | | 7/1950 | Maranz |
| 2,702,460 | A | | 2/1955 | Gaugler |
| 2,737,024 | A | | 3/1956 | Swenson |
| 2,745,261 | A | * | 5/1956 | Merrill ........................ 62/342 |
| 2,772,784 | A | | 12/1956 | Cyphers et al. |
| 3,196,627 | A | | 7/1965 | Swenson |
| 3,227,904 | A | | 1/1966 | Levin |
| 3,229,647 | A | | 1/1966 | Von Drachenfels et al. |
| 3,255,815 | A | | 6/1966 | Smith |
| 3,264,836 | A | | 8/1966 | Miller et al. |
| 3,317,198 | A | | 5/1967 | Phelan et al. |
| 3,803,870 | A | | 4/1974 | Conz |
| 3,898,858 | A | | 8/1975 | Erickson |
| 3,928,646 | A | * | 12/1975 | Hartley ........................ 426/549 |

(Continued)

FOREIGN PATENT DOCUMENTS

EP    1 027 832 A1    8/2000

(Continued)

OTHER PUBLICATIONS

Partial International Search Report for PCT/US2004/033265, date of mailing Feb. 18, 2005, received Feb. 25, 2005, 2 pages.

(Continued)

*Primary Examiner*—William E. Tapolcai
(74) *Attorney, Agent, or Firm*—Foley & Lardner LLP (57) ABSTRACT

A motor system can be provided for a tank for mixing and chilling ice cream. The motor system includes a variable speed motor having a speed control. The speed control can be utilized to operate the motor in a forward or reversed speed or across a spectrum of more than two forward speeds. The motor can drive an auger. The auger can be operated in reverse to add semi-solid or solid inclusions to ice cream mix. The inclusions can be added through an aperture at the output of the tank. Appropriate time for discharge can be determined by time, temperature, or amperage.

20 Claims, 7 Drawing Sheets

U.S. PATENT DOCUMENTS

| | | | |
|---|---|---|---|
| 3,952,534 A | | 4/1976 | Jacobs |
| 3,958,968 A | * | 5/1976 | Hosaka .................. 62/343 |
| 3,961,494 A | | 6/1976 | Schaefer et al. |
| 4,019,689 A | * | 4/1977 | Hunt .................. 241/282.1 |
| 4,052,180 A | | 10/1977 | Erickson |
| 4,094,168 A | | 6/1978 | Hamner et al. |
| 4,162,127 A | | 7/1979 | Wakeman et al. |
| 4,275,567 A | | 6/1981 | Schwitters |
| 4,332,145 A | | 6/1982 | Yuhasz et al. |
| 4,383,417 A | | 5/1983 | Martineau |
| 4,412,428 A | | 11/1983 | Giannella et al. |
| 4,438,634 A | * | 3/1984 | Merle et al. .................. 62/123 |
| 4,463,572 A | | 8/1984 | Brown, Jr. |
| 4,502,617 A | | 3/1985 | Stecker et al. |
| 4,537,045 A | | 8/1985 | Mayer |
| 4,619,116 A | * | 10/1986 | Cristante .................. 62/233 |
| 4,625,525 A | | 12/1986 | Bradbury et al. |
| 4,637,221 A | * | 1/1987 | Levine .................. 62/342 |
| RE32,360 E | | 2/1987 | Martineau |
| 4,702,611 A | * | 10/1987 | Crossley .................. 366/343 |
| 4,703,628 A | | 11/1987 | Togashi et al. |
| 4,736,600 A | * | 4/1988 | Brown .................. 62/342 |
| 4,747,272 A | | 5/1988 | Howell et al. |
| 4,758,097 A | | 7/1988 | Iles, Sr. |
| 4,878,760 A | | 11/1989 | Newton et al. |
| 5,016,446 A | | 5/1991 | Fiedler |
| 5,158,506 A | | 10/1992 | Kusano et al. |
| 5,201,861 A | | 4/1993 | Menzel |
| 5,245,833 A | | 9/1993 | Mei et al. |
| 5,653,118 A | | 8/1997 | Cocchi et al. |
| 5,706,720 A | | 1/1998 | Goch et al. |
| 5,755,106 A | | 5/1998 | Ross |
| 5,816,455 A | | 10/1998 | Alpers et al. |
| 5,916,248 A | | 6/1999 | Bravo |
| 5,934,516 A | | 8/1999 | Strycharske et al. |
| 6,082,120 A | | 7/2000 | Hoffmann et al. |
| 6,119,472 A | | 9/2000 | Ross |
| 6,253,573 B1 | | 7/2001 | Schwitters et al. |
| 6,370,892 B1 | | 4/2002 | Ross |
| 2001/0037656 A1 | | 11/2001 | Ross |
| 2003/0061830 A1 | | 4/2003 | Ross |
| 2003/0150227 A1 | | 8/2003 | Ross et al. |
| 2003/0150236 A1 | | 8/2003 | Ross et al. |

FOREIGN PATENT DOCUMENTS

| | | |
|---|---|---|
| WO | WO 96/11583 A1 | 4/1996 |
| WO | WO 99/65325 A1 | 12/1999 |

OTHER PUBLICATIONS

International Search Report and Written Opinion for Application No. PCT/US2004/033265, mailed May 23, 2005, received May 31, 2005, 15 pages.

* cited by examiner

ICE CREAM MACHINE WITH SPECIALIZED MOTOR

FIELD

The present application relates to a food making system. More particularly, the present invention relates to a frozen food making or food chilling system, such as, an ice cream machine or frozen custard making machine.

BACKGROUND OF THE INVENTION

Chilling systems for food such as frozen custard or ice cream making machines are discussed in U.S. Pat. Nos. 6,119,472, 6,370,892, 6,101,834, and 5,755,106. Ice cream making machines can generally include a cooling chamber surrounded by an evaporator. The ice cream or frozen custard is agitated and frozen in a batch mixing chamber or barrel so that the quantity of ice cream is produced as the result of one operation. A "gate" or "knife" valve of such conventional ice cream making machines dispenses the ice cream from the barrel to a container. Such ice cream making machines typically provide ice cream when such valve is slid from a "down" or closed position to an "up" or opened position.

Conventional ice cream machines have included a motor driven auger for mixing the liquid ice cream and frozen ice cream within the chamber or barrel. The auger is generally provided in a cylindrical cooling chamber. The auger includes paddles, blades or impellers that mix the ice cream and wipe the internal surfaces of the barrel free of ice cream product.

The motor driven auger is also utilized to transfer the ice cream from the input of the chamber or barrel to the output of the chamber or barrel (associated with the gate). Generally, smaller ice cream machines and batch freezing ice cream machines have utilized a motor with relatively limited capabilities. Smaller ice cream machines and batch freezing ice cream machines typically have utilized a motor that allows only two speed agitation. Such machines have typically not utilized reverse agitation.

The limited motor capabilities have not allowed the operator to mix ice cream at a variety of speeds. The mixing speed can affect the amount of air mixed into and/or fluffiness of the finished ice cream product (generally called overrun). It is desirable to allow the user to customize the final ice cream product for fluffiness.

It has been desirable to manufacture food stuffs including solid or semi-solid materials or inclusions. For example, mixing nuts, granola, chocolate and other chips, foodstuffs, candy bars, cookies, fruits, or other morsels (referred to generically in this application as inclusions) into ice cream has been utilized to develop many flavors that are highly desired by customers. Typically, such solid or semi-solid inclusions are placed in the cooling chamber or barrel of the ice cream machine along with the liquid ice cream. The motor driven auger used to mix or agitate the liquid ice cream and transport the frozen ice cream to the front of the chamber or barrel also mixes the solid or semi-solid inclusions. This mixing can cause the solid or semi-solid inclusions to be ground or reduced in size.

Other conventional techniques for mixing inclusions with ice cream place the solid or semi-solid inclusions into the chamber or barrel after the ice cream has been frozen or partially frozen. Typically, inclusions are added during the last few minutes of the freezing operation when the consistency of the mix is thick. The thick consistency makes it difficult to transport inclusions into the barrel or chamber, much less evenly distribute the inclusions within the ice cream.

Further, using a forward mixing motion does not allow complete mixing of the solid or semi-solid inclusions with the frozen ice cream because the inclusions are pushed to the front of the barrel or chamber. When inclusions are pushed to the front of the chamber, the inclusions are not fully mixed with the ice cream product at the rear of the chamber. The front of the barrel or chamber is where the ice cream exits at the gate.

When the ice cream has reached a particular consistency suitable for serving, the gate can be opened and ice cream can be removed from the chamber. Generally, it is desirable to determine the temperature within the chamber to determine the consistency of the ice cream. In other words, a method is required for determining the appropriate time to end the freezing operation and to initiate the discharge procedure for the ice cream product.

Heretofore, smaller ice cream machines and batch freezing ice cream machines have determined such temperature through historical time, and the measurement of the amperage provided to the motor that drives the auger. Certain conventional soft serve machines have used indirect temperature readings. According to the indirect technique, product temperature is estimated not by measuring actual temperature, but by measuring the temperature of surrounding components and estimating the product temperature. Such conventional systems do not provide a highly accurate apparatus for and method of obtaining actual temperature of the product within the cooling chamber.

Therefore, there is a need for a machine for making ice cream that can regulate the speed of mixing in an ice cream machine or foodstuff freezing machines. Further, there is a need for a machine and method of making ice cream with solid or semi-solid inclusions without grinding the inclusions. Further, there is a need for a motor system that more selectively controls the mixing of ice cream. Further still, there is a need for a machine for making ice cream having a reversing motor. Yet even further, there is a need for a system and method of determining the temperature within the cooling chamber with more accuracy. Yet further, there is a need for an ice cream machine having one or more of these or other advantageous features.

SUMMARY OF THE INVENTION

An exemplary embodiment relates to a motor system for mixing and chilling ice cream. The motor system includes a variable speed motor having a speed control. The speed control allows the motor speed to be chosen across a spectrum of more than two speeds. The motor system is for a batch freezing machine or smaller machine.

Another exemplary embodiment relates to an ice cream machine. The ice cream machine includes a cooling chamber. The cooling chamber includes an auger. The auger is operable in a forward motion and a reverse motion.

Yet another embodiment relates to a system for dispensing ice cream from a machine for making ice cream. The ice cream machine has a tank for mixing and freezing the ice cream. The system includes means for mixing ice cream in the tank, means for controlling the means for mixing. The mixing is controlled at more than two forward speeds or in a forward and reverse motion.

Yet another exemplary embodiment relates to a method of mixing ice cream in a tank for mixing and freezing the ice cream. The method includes mixing the ice cream at a first speed in the tank, adding solid or semi-solid inclusions to the tank, and mixing the ice cream and the semi-solid or solid inclusions at a second speed.

BRIEF DESCRIPTION OF THE DRAWINGS

Exemplary embodiments will hereafter be described with reference to the accompanying drawings, wherein like numerals denote like elements, and.

DETAILED DESCRIPTION OF THE PREFERRED EXEMPLARY EMBODIMENTS

Figure 1:
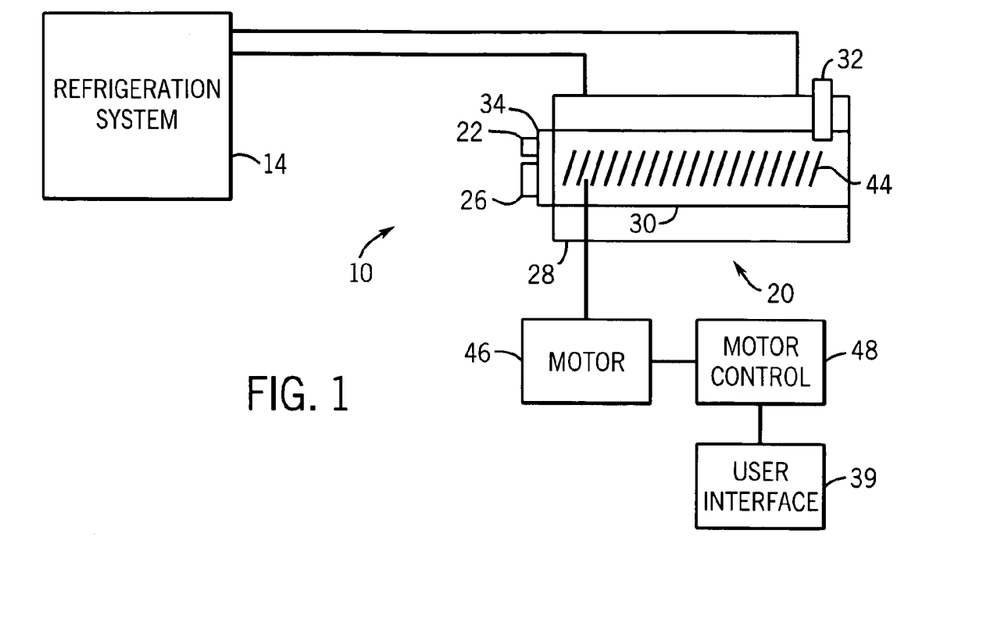
FIG. 1 is a general block diagram of a machine for making ice cream according to an exemplary embodiment.

A system of making custard or ice cream is shown in FIG. 1 as a batch freezer or machine for making ice cream 10 according to an exemplary embodiment. Ice cream making machine 10 includes an evaporator or barrel tank 20 including a tank or cooling chamber 40 in which a batch of liquid ice cream is mixed with a mixer or auger 44. The liquid ice cream is frozen in tank 20 so that a thick or solid consistency is achieved. A gate such as dispensing system 26 provides solidified ice cream from tank 20 to a storage unit or collector such as a pint or one gallon container.

According to a particularly preferred embodiment, ice cream making machine 10 is a batch freezer having a capacity of about 20 quarts (or about 4–40 quarts according to alternative embodiments). Ice cream making machine 10 is preferably a smaller size than industrial ice cream making systems, hereinafter referred to as batch ice cream machines and smaller machines. According to a particularly preferred embodiment, the machine for making ice cream is a model no. BA-20 batch freezer commercially available from Ross's Manufacturing of Escanaba, Mich. According to an alternative embodiment, the machine for making ice cream is of the type disclosed and described in U.S. patent application Ser. No. 222,754 titled "Ice Cream Machine Having An Auxiliary Evaporator Tank" filed Aug. 16, 2002 listing inventor Harold F. Ross of Bark River, Mich., or U.S. Pat. Nos. 6,119,472, 6,370,892, 6,101,834, and 5,755,106 all incorporated herein by reference. According to another alternative embodiment, the machine for making ice cream is a model number 101W single barrel frozen custard machine commercially available from Ross's Manufacturing of Escanaba, Mich. The claims are not limited to specific tank geometry, evaporator designs and refrigeration components.

Machine 10 allows for various speeds and directionality in the mixing process. In addition to allowing for even distribution of inclusions, machine 10 also allows for variation of air entrainment within the product, (e.g., a lower rpm speed does not agitate the ice cream product as fully and therefore does not allow as much air to be entrained within the product). Air entrainment is generally noted as overrun. The faster the beater (auger 44) revolutions per minute (rpm), generally the higher the product overrun is. With an adjustable motor speed (rpm), air entrainment can be adjusted to an operator's particular specifications.

A refrigeration system 14 preferably provides refrigerant to evaporator 20 so that food contents, such as, ice cream or frozen custard, can be frozen or semi-frozen in cooling chamber 30. Liquid ice cream for a mix can be provided through cooling chamber input 32 to cooling chamber 30. The mix is frozen or semi-frozen and provided to an output of cooling chamber 30. The output of cooling chamber 30 is preferably a dispensing system 26.

Dispensing system 26 can be similar to the dispensing system described in U.S. patent application Ser. No. 10/464, 425, invented by Ross, filed Jun. 18, 2003, incorporated herein by reference. Machine 10 is not limited to using a specific type of dispensing system 26.

Dispensing system 26 is disposed on a door 34 that covers an output of cooling chamber 30. Ice cream in cooling chamber 30 is pushed by auger 44 from a back to a front (e.g., towards door 34) when operated in a forward motion. Motor 46 is advantageously a variable speed motor and can operate in forward or reverse and/or can operate at more than two forward speeds.

Motor 46 is controlled by a motor drive circuit or motor control circuit 48 that can be coupled to a user interface 39. Motor 46 can be driven by a variable frequency drive, thereby allowing customer controlled speed variation from a control screen (interface 39), forward and reverse beater (auger 44) operation, and amperage sensing and control. Preferably, motor control circuit 48 allows motor 46 to operate in a forward motion and a reverse motion as well as at more than two speeds. In one embodiment, a continuous spectrum of motor speeds is available to the operator of machine 10.

Variable speed motor drive or circuit 48 can be a Model 176F7330 manufactured by Danfoss, Inc. Motor 46 can be a 3-horsepower (HP) type 213T frame motor manufactured by Boston Gear, Inc. Alternative motor-types and drive types can be utilized to achieve the advantageous features discussed below without departing from the scope of the present invention.

Variable speed motor drive or circuit 48 provides significant advantages. Circuit 48 can allow motor 46 to start at a lower rpm and ramps up to required rpms, thus reducing mechanical component wear. Circuit 48 also can allow motor 46 to operate in a safe automatic reversing of motor direction. Further, the use of drive 48 can allow for soft starts and stops as well as limiting motor 46 to reduce quick starts and stops of machine 10. According to another advantage, circuit 48 can include a built-in over-amperage protection including an adjustable programmable over-amperage circuit. Manual over protection is not necessarily required. Further still, circuit 48 can allow infinite adjustment of motor speeds, thereby providing benefits described above in operation and allowing the user to personalize settings for unique product characteristics.

In a preferred embodiment, door 34 advantageously includes a slot or aperture 22 through which solid and semi-solid inclusions can be provided. Door 34 is preferably plastic, such as, food grade plastic. Evaporator or tank 20 is preferably a stainless steel material. In a preferred embodiment, aperture 22 is in addition to any apertures necessary for dispensing system 26.

Figure 2:
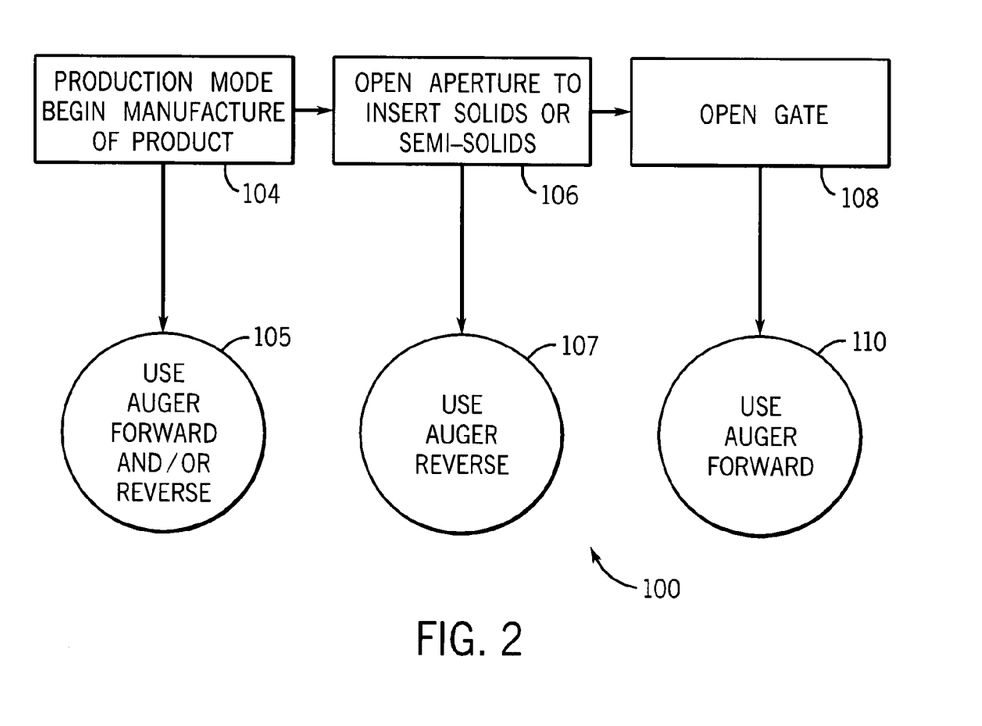
FIG. 2 is a flow diagram showing operation of the machine for making ice cream illustrated in FIG. 1 according to another exemplary embodiment.

With reference to FIG. 2, operation of system 10 is described with reference to flow diagram 100. In a state 104, production mode begins and manufacture of a food product begins. In state 104, food such as liquid ice cream is provided to chamber 40 through input 32 and motor control circuit 48 controls motor 46 so auger 44 is driven in a forward motion or reverse motion according to a state 105. Preferably, the motion (e.g., speed) of auger 44 can be adjusted according to a particular recipe. Preferably, auger 44 is operated in a reverse motion for mixing.

In one embodiment, auger 44 is operable at approximately 100 revolutions per minute (rpm) in a backwards motion for proper mixing of food product, such as liquid ice cream. Applicant has found that operating auger 44 in backwards motion has decreased freezing time 10 percent compared to a forward motion. Alternatively, the backwards motion can be used to increase the capacity of machine 10. In other embodiments, auger 44 can be cycled at various speeds for various time periods to provide efficient mixing of the product, such as, liquid ice cream. Exemplary forward speeds include 50–200 rpm. For example, faster mixing speeds can be used to add air (air entrapment) or provide a fluffier texture to the ice cream or other product.

In one preferred embodiment, a standard setting of 100 rpm is used in the freezing process (state 104). A maximum recommended setting is 150 rpm and a minimum recommended setting is 75 rpm. Revolutions per minute can be adjustable by the operator through user interface 39. The speed (rpm) can affect percentage of overrun as well as ice crystal size. Other variables that can affect overrun and ice crystal size are mix type, paddle design for auger 44, and blade quantity for auger 44.

In a state 106, after the food (e.g., ice cream) is formed in cooling chamber 30, solid or semi-solid inclusions are provided through aperture 22. Auger 44 is operated in a reverse motion to mix solid or semi-solid inclusions with the ice cream in chamber 30 according to a state 107.

Advantageously, auger 44 is operated in a low speed reverse motion (e.g., 100 rpm) state 106. The use of a reverse speed motion allows the inclusions to be evenly distributed through the solid or semi-solid food (e.g., ice cream) in chamber 40. Unlike conventional systems, the inclusions are not ground or otherwise adversely affected due to the mixing operation. The use of the reverse motion pushes the inclusions from a front (e.g., door 34) to a rear of cooling chamber 30.

According to one preferred embodiment, in the introduction of inclusions mode of operation (state 106), a maximum recommended reverse rpm setting is 100 and a minimum recommended rpm setting is 30. Reverse operation of motor 46 is preferably achieved through the use of circuit 48 embodied as a variable frequency motor drive.

In an alternative embodiment, several reverse speeds can be utilized. Faster speeds are preferred for smaller size inclusions. Exemplary reverse speeds include 20–120 rpm.

In a state 108, after the inclusions have been mixed or distributed within the product (e.g., ice cream), dispensing system 26 is opened and auger 44 is operated in a forward motion in accordance with state 110. In one embodiment, the forward motion transports the frozen ice cream through dispensing system 26. Preferably, auger 44 is ramped to a speed of 200 rpm to transport ice cream through dispensing system 26 (e.g., for final barrel discharge). Electronic instrumentation of machine 10 enables the operator to select to begin discharge procedures in response to either time, motor power, or temperature parameters.

According to one preferred embodiment, the speed for a discharge operation (state 108) can include a first stage discharge at 100 rpm and a second stage discharge at 200 rpm. Initial speed of motor 46 in rpm at discharge is lower, which limits amperage. As ice cream product is discharged from chamber 40 and chamber 40 is emptied, the speed of motor 46 and rpm is allowed to increase. The discharging process uses centrifugal force to push the product texture from the barrel. By controlling the speed of motor 46, the product can be discharged at a firmer texture without over exercising motor 46.

Determining when the contents of cooling chamber 30 are sufficiently chilled, semi-frozen or frozen, can be achieved by a variety of methods. Machine 10 allows such a determination to be made automatically through the reaction of circuits 48 and interface 39 to any of time, motor amperage, or directly measured temperature parameters.

In one embodiment, the amperage associated with motor 46 is measured to determine the thickness of the mix within chamber 30. A higher amperage indicates thicker contents of chamber 30. A thicker content generally indicates a lower temperature in chamber 40.

In an alternative embodiment, a temperature sensing instrument can be provided through door 34 to directly measure temperature of the contents within cooling chamber 30. Preferably, the mix in chamber 30 is sufficiently frozen at a temperature of 24° Fahrenheit. Machine 10 is preferably designed with a temperature sensing instrument that penetrates the freezing barrel and measures the actual temperature within chamber 40.

Figure 3:
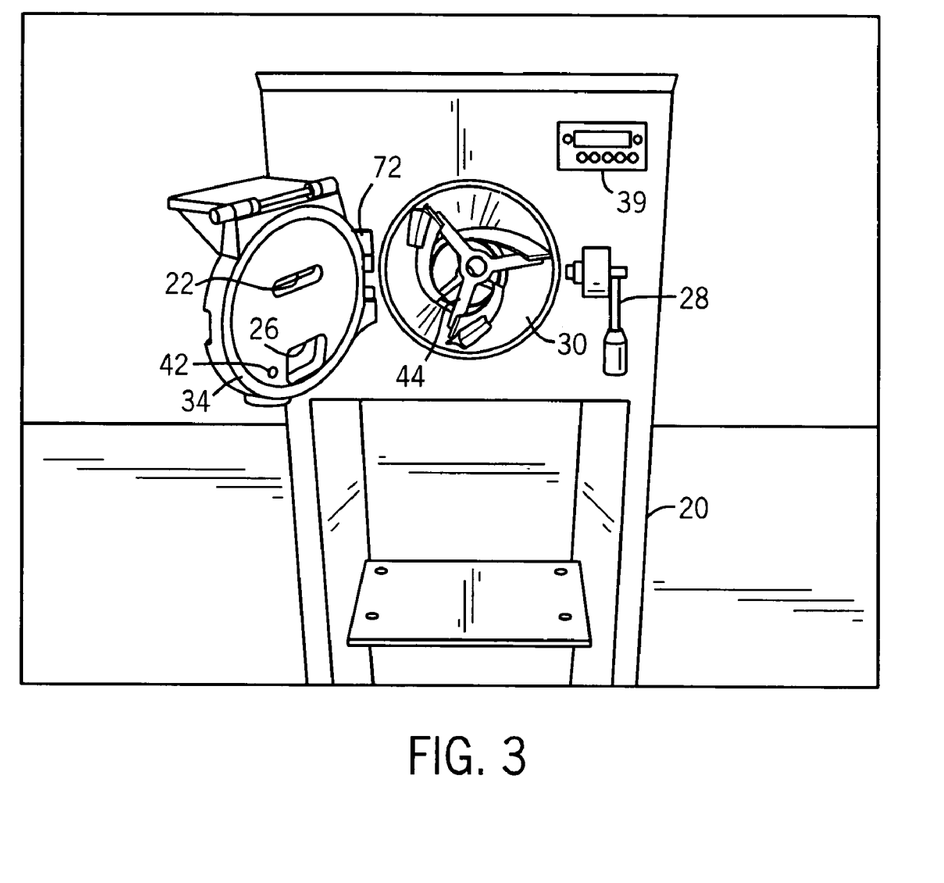
FIG. 3 is a more detailed schematic front planar view of the machine for making ice cream illustrated in FIG. 1, showing a door in an opened position according to yet another exemplary embodiment.

With reference to FIG. 3, door 34 includes aperture 22 above the aperture for dispensing system 26. Door 34 can be locked at an end of cooling chamber 30 by a handle 28. User interface 39 is disposed on a front of tank 20 can be utilized to provide signals to motor control circuit 48 as well as provide messages to the operator.

A temperature sensing instrument can be provided at location 42 on door 34. The temperature sensing instrument can be a thermocouple or temperature sensor provided through an aperture at location 42. An RTD resistive temperature device can be used. Alternative locations can be utilized in door 34 for providing access to the inside of cooling chamber 30 for temperature measurements. Door 34 provides an advantageous location for mounting a temperature sensor. Alternatively, the temperature sensor can be provided through a back of chamber 40.

Door 34 is selectively positionable about a hinge 72 by handle 28. In a closed position of door 34 (see FIG. 4), tank or cooling chamber 30 is substantially sealed for the freezing of the liquid ice cream. A locking mechanism 28 secures door 34 in a closed position. In an opened position of door 34 (FIG. 3), access is provided to chamber 30. Access to chamber 30 is useful for cleaning liquid and solidified ice cream from chamber 30, auger 44 and dispensing system 26 according to an exemplary embodiment.

Figure 4:
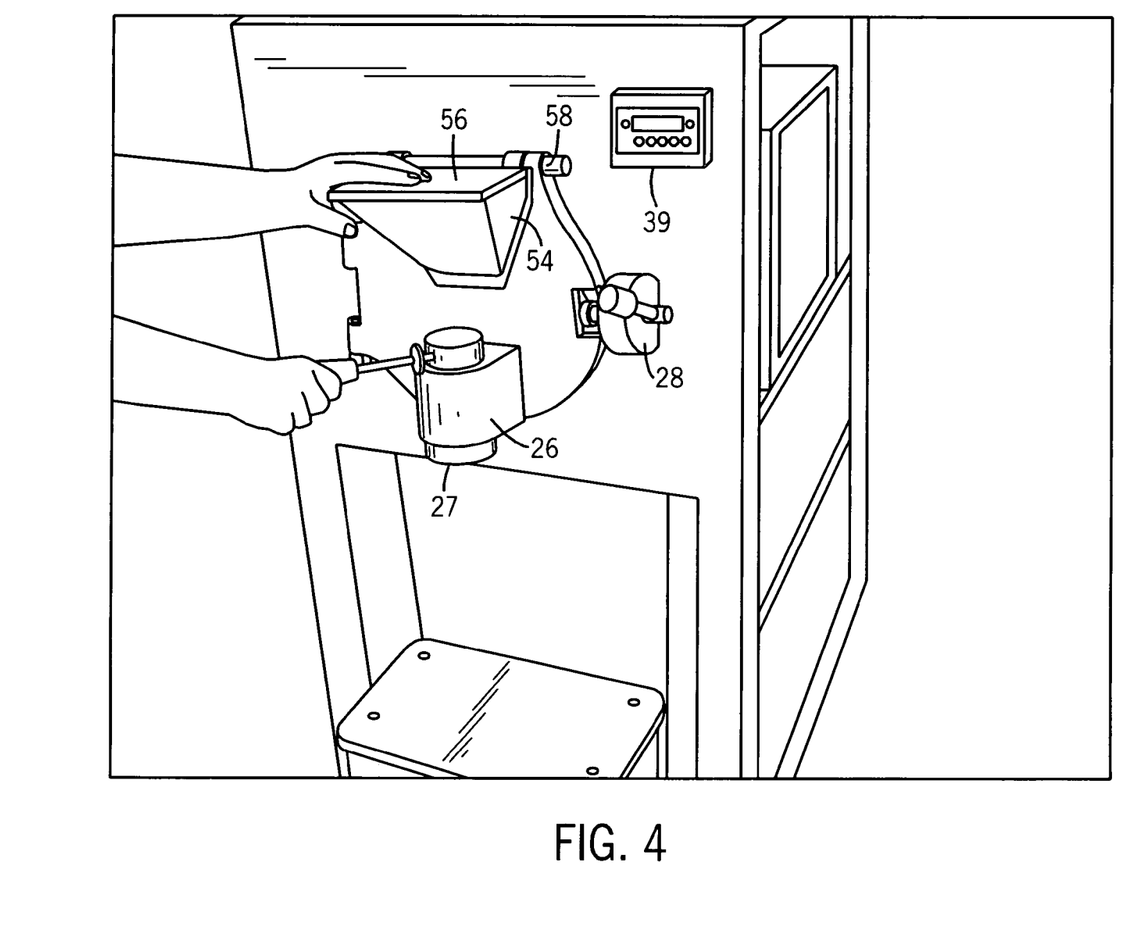
FIG. 4 is a more detailed schematic perspective front view of the machine for making ice cream illustrated in FIG. 1, showing a door in a closed position according to still another exemplary embodiment.

With reference to FIG. 4, dispensing system 26 is preferably arranged to allow regulation or metering of the amount solidified ice cream that is provided at gate or output 27. An inclusion dispensing system 23 for inputting inclusions is disposed of above system 26. System 23 includes aperture 22 in communication with a bin 54 through door 34. Bin 54 can be covered a top cover 56. Bin 54 is preferably a stainless steel material and top cover 56 is preferably a food grade plastic.

Top cover 56 is pivotally moveable via a hinge 58 attached to door 34. Solid or semi-solid inclusions can be provided in bin 48 for mixing in cooling chamber 30. Preferably, an operator opens cover 56 and pours the inclusions into bin 54. The inclusions fall through aperture 22 and are mixed into cooling chamber 30 through the reverse operation of auger 44.

Figure 5:
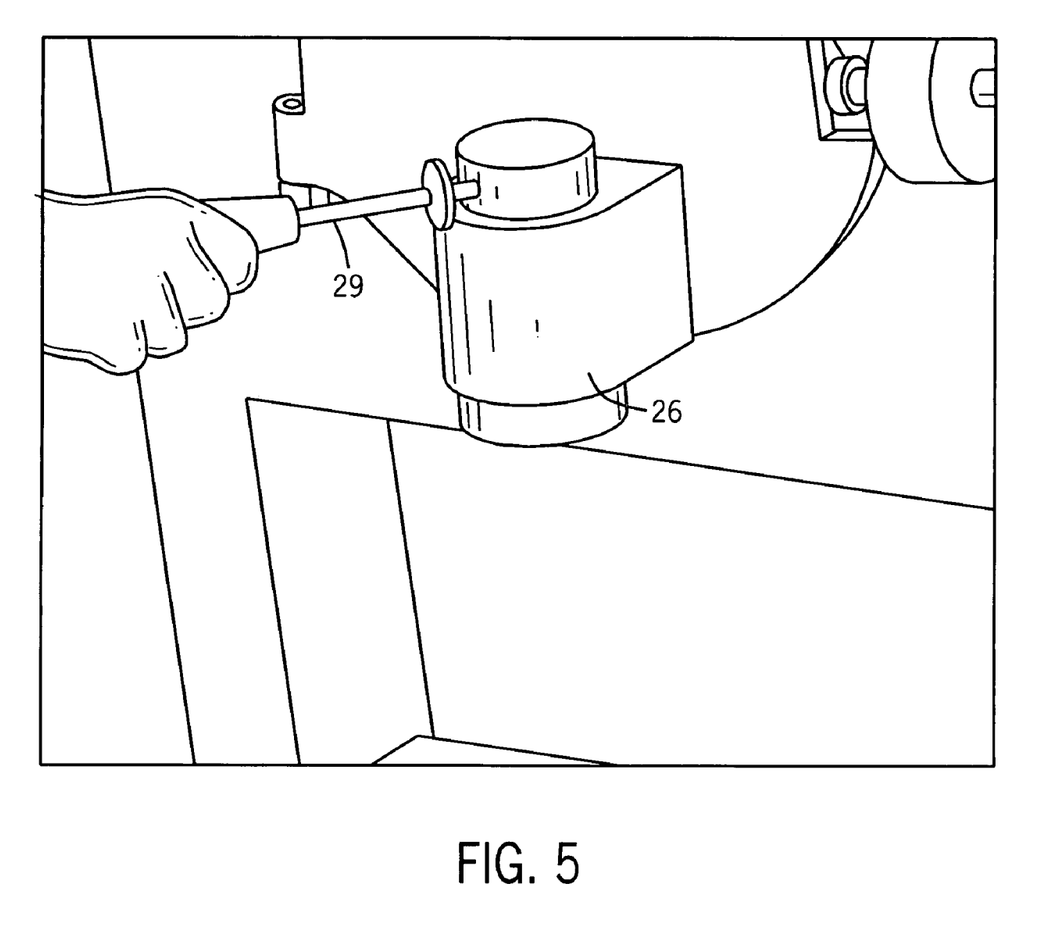
FIG. 5 is a more detailed perspective schematic view of a dispensing system for the door illustrated in FIG. 4 according to another exemplary embodiment.

With reference to FIG. 5, dispensing system 26 preferably allows a continuous spectrum of metering levels. Dispensing system 26 is preferably a valve system including a cylindrically shaped ring having a cavity. The cavity is tapered such that at its upper diameter is less than its lower diameter. The shape and taper of the ring corresponds to the shape and taper of a plug comprised of a conical or frustoconical shaped wedge configured to fit securely into the ring. Depending upon the position (from left-to-right) of handle 29 of dispensing system 26, variable rates of ice cream can be provided through dispensing system 26.

Figure 6:
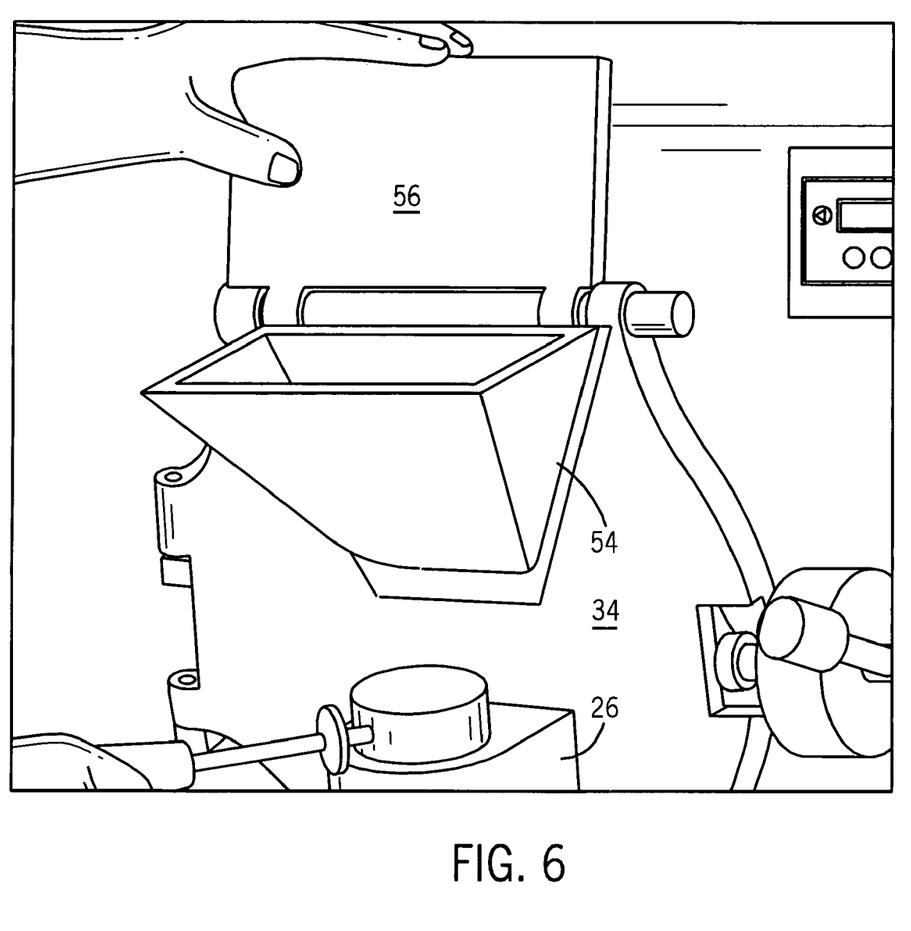
FIG. 6 is a more detailed perspective schematic view of the door illustrated in FIG. 4 showing a bin for semi-solid and solid inclusions according to still another exemplary embodiment.

With reference to FIG. 6, top cover 56 above bin 54 is shown in an open position. Bin 54 is in communication with aperture 22 thereby providing access to cooling chamber 30. The elevated nature of aperture 22 with respect to the bottom of chamber 30 preferably prevents ice cream from being pushed through aperture 26 to and out of bin 54. Alternatively, a one-way valve can be provided at aperture 22 or cover 56 can include a locking mechanism.

Figure 7:
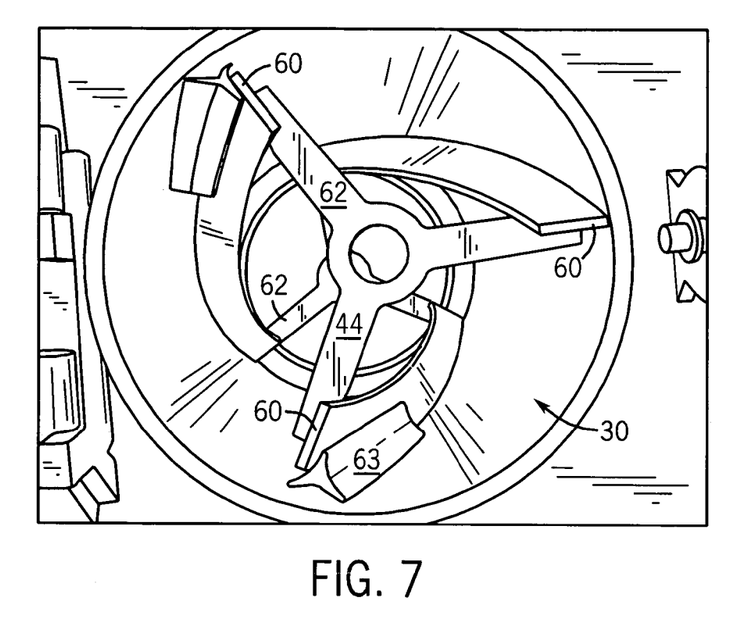
FIG. 7 is a more detailed schematic front planar view of an auger for use in a machine for making ice cream of FIG. 1, in accordance with still yet another exemplary embodiment.
Figure 8:
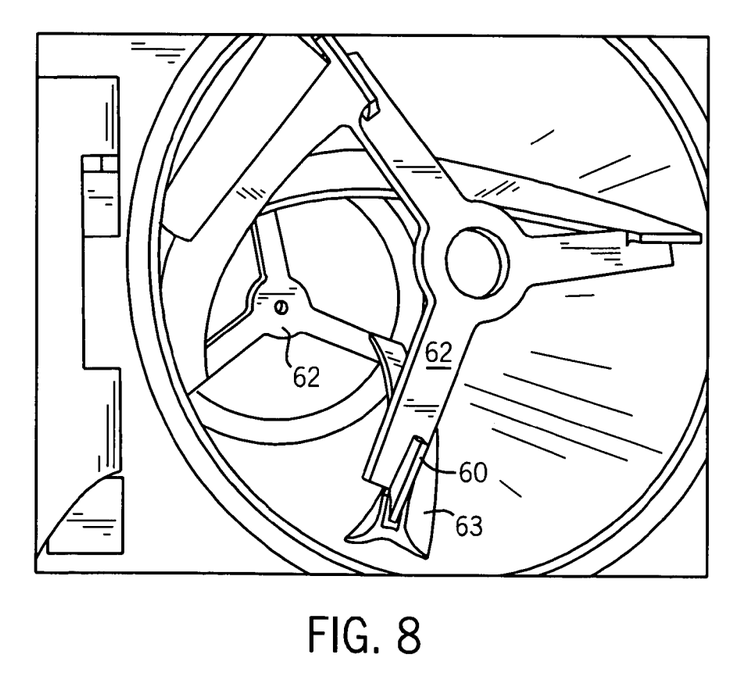
FIG. 8 is a more detailed perspective schematic view of the auger illustrated in FIG. 7.

With reference to FIG. 7, auger 44 preferably include at least three blades 60. Each blade 60 includes a food grade plastic type wiper 63. Wipers 63 wipe the inside surface of chamber 30 clean. Blades 60 preferably have a relatively large pitch such as an approximately 30 degree pitch. The large pitch provides superior performance for slow operations and reverse operations.

Auger 44 includes two members 62 coupled to blades 60. Member 62 are preferably in axial alignment and offset in rotational alignment with respect to each other, thereby providing a curve to blades 60. Preferably, element 62 in a rear of cooling chamber 30 is driven by motor 46.

Figure 9:
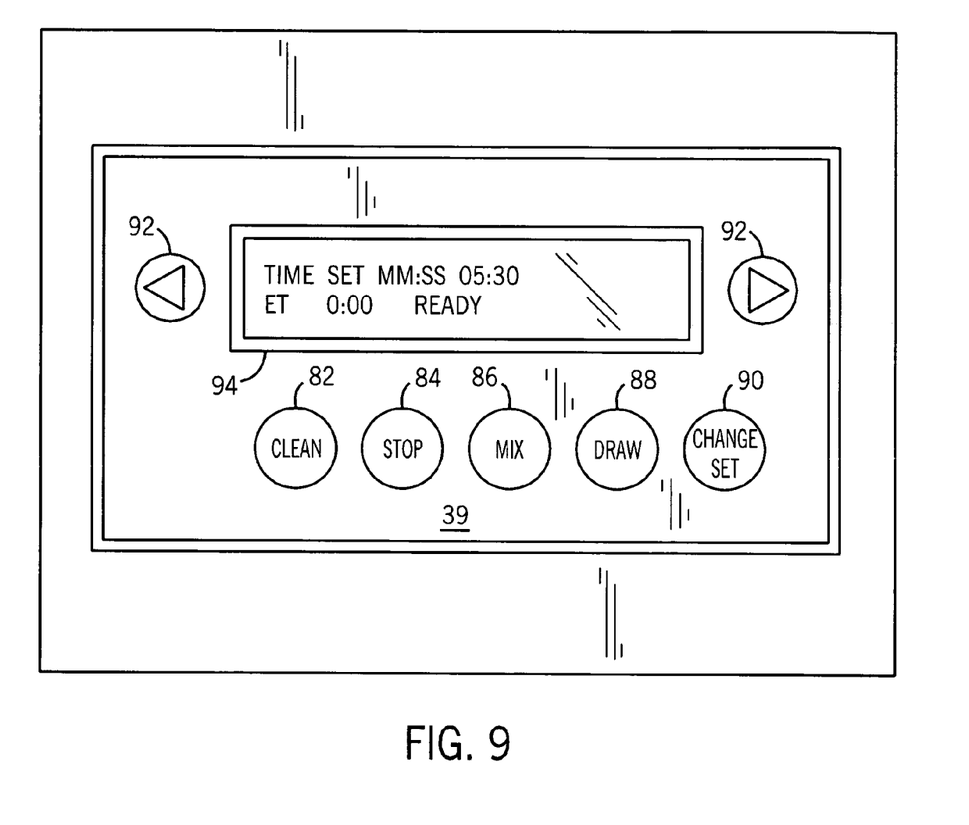
FIG. 9 is a more detailed front planar view of a user interface for the ice cream making machine of FIG. 1 in accordance with still another exemplary embodiment.

With reference to FIG. 9, user interface 39 includes a clean button 82, a stop button 84, a mix button 86, a draw button 88, and a change settings button 90. In addition, arrows 92 can be utilized to adjust commands provided on a display and set information provided on a display 94. Display 94 can provide timing information which is set via arrows 92. User interface 39 is preferably a PLC programmable controller part no. TWDLCAA24DRF manufactured by Telemechanique and a programming screen and display part no. XBTN200 manufactured by Telemechanique.

The operation of machine 10 in response to buttons 82, 84, 86, 88, 90 and 92 is discussed below.

Button 82 is the clean button. Use of button 82 turns refrigeration off and causes beater motor (motor 46) to operate at approximately 100 rpm. Water can be poured into barrel or chamber 40 by the operator. Motor 46 agitates the water and breaks up frozen ice cream product. Machine 10 operates in clean mode for 3 minutes, after which the beater motor (motor 46) operates. Dirty water is discharged from barrel (chamber 40), usually without beater operation.

Button 84 is the stop button. Use of button 84 ends all beater (auger 44) and refrigeration operations.

Button 86 is the mix button. Use of button 86 initiates the beater at its production speed of approximately 80–120 rpm in one embodiment. It also initializes refrigeration cooling of cooling chamber 40. Depending on mode of operation, either time, temperature or amperage ceases refrigeration cooling system at the appropriate texture. An alert sound can notify the operator of the completed product. Beater motor (motor 46) continues until machine 10 is put into stop or discharge mode.

Button 88 is a draw button. Draw button 88 turns the beater motor to push the product forward and out of the discharge valve (system 26). In one embodiment, the refrigeration system (system 14) ceases operation, beater motor (motor 46) runs at a initial speed of approximately 100 rpm for 30 seconds at which time the motor rpm increases to a 200 rpm for an additional 2.5 minutes. After 3 minutes, the beater motor stops.

Button 90 is a change setting button. Button 90 is utilized for changing set points within the push button controller for either set point changes to time, temperature, amperage, or revolutions per minute.

Arrow buttons 92. Arrow buttons 92 are used to scroll from screen to screen determining with which mode of operation machine 10 is controlled. In addition, arrow buttons 92 allow movement of cursor within each screen for change of set point.

The features and operations described above can be implemented by hardware or software and are not disclosed in a limiting fashion unless explicitly and specifically recited in the claims. For example, controllers in circuit 38 or interface 39 can execute software to respond to commands on interface 39. Alternative, hardware logic circuits and/or ASIC devices can be configured to provide appropriate motor operations at appropriate times.

It is understood that while the detailed descriptions, specific examples, material types, thickness, dimensions, and shapes discussed provide preferred exemplary embodiments of the present invention, the preferred exemplary embodiments are for the purpose of illustration only. For example, the dispensing system may be used with an ice cream making machine, or other machines for dispensing ice cream after it is made according to alternative embodiments. The method and the system of the present invention are not limited to the precise details and conditions disclosed. Various changes will be made to the details disclosed without departing from the scope of the invention, which is defined by the following claims.

What is claimed is:

1. A batch freezing machine or smaller machine for mixing and chilling ice cream, the batch freezing machine comprising a variable speed motor having a speed control, the speed control allowing the motor speed to be chosen across a spectrum of more than two speeds, wherein the speed control allows the motor to be ramped up from a zero speed across the spectrum to a production speed, wherein the speed control includes a reverse speed and the motor is mechanically coupled to an auger, wherein the auger is utilized in a forward direction to produce ice cream and in a reverse direction to mix inclusions into the ice cream from an inclusions input.

2. The system of claim 1 wherein the variable speed motor has a reverse speed.

3. The system of claim 2 wherein the spectrum is a continuous spectrum.

4. An ice cream machine, the ice cream comprising a cooling chamber including an auger, the auger being operable in a forward motion and a reverse motion wherein the ice cream machine includes an ice cream input and an inclusions input, wherein liquid ice cream is provided to the ice cream input and semi-solid or solid inclusions are provided to the inclusions input, wherein the auger is used to produce frozen ice cream from the liquid ice cream and to mix the inclusions, wherein the auger is operated in a reverse direction to introduce the inclusions and a forward direction to produce the frozen ice cream.

5. The machine of claim 4, further comprising a gate at an output of the cooling chamber, the gate metering the flow of ice cream from the cooling chamber.

6. The ice cream machine of claim 5, further comprising:
an aperture at the output of the cooling chamber, the aperture for receiving semi-solid or solid inclusions.

7. An ice cream machine, comprising:
a cooling chamber including an auger, the auger being operable in a forward motion and a reverse motion;
a gate at an output of the cooling chamber, the gate metering the flow of ice cream from the cooling chamber; and
an aperture at the output of the cooling chamber, the aperture for receiving semi-solid or solid inclusions, wherein the solid or semi-solid inclusions are mixed into ice cream within the cooling chamber by operating the auger in the reverse motion and introducing the inclusions through the aperture.

8. The machine of claim 4 wherein the auger motor is driven by a motor, the motor being a variable speed motor, the motor capable of operating at more than two speeds.

9. The ice cream machine of claim 5 wherein the gate is provided on a door that covers an end of the cooling chamber.

10. An ice cream machine, comprising:
a cooling chamber including an auger, the auger being operable in a forward motion and a reverse motion; and
a gate at an output of the cooling chamber, the gate metering the flow of ice cream from the cooling chamber, wherein the gate is provided on a door that covers an end of the cooling chamber and wherein the door includes an aperture for introducing solid or semi-solid inclusions.

11. The ice cream machine of claim 10 wherein a temperature sensor is provided through the door or a rear of the cooling chamber.

12. The ice cream machine of claim 10 wherein the door is manufactured from plastic.

13. The ice cream machine of claim 11 wherein the door is a food wade plastic.

14. A system for dispensing ice cream from a machine for making ice cream having a tank for mixing and freezing the ice cream, the system comprising:
means for mixing ice cream in the tank; and
means for controlling the means for mixing, wherein mixing is controlled in a forward and reverse motion, wherein the tank includes an ice cream input and an inclusions input, wherein die means for mixing is operated in the forward motion to move ice cream from the ice cream input and in the reverse motion to mix inclusions from the inclusions input.

15. The system of claim 14 wherein the means for mixing includes an auger and a variable speed motor.

16. The system of claim 15 wherein the means for controlling includes a keypad.

17. The system of claim 15 further comprising a door having an aperture, the aperture being the inclusions input.

18. An improved ice cream machine including a tank for mixing and freezing the ice cream, the improvement comprising:
at least one motor for mixing the ice cream in the tank at a first velocity and for mixing semi-solid or solid inclusions at a second velocity and an ice cream input for receiving liquid ice cream and an inclusions input for receiving the solid or semi-solid inclusions, the inclusions input being closer to an ice cream output than to the ice cream input, wherein the first velocity is a forward motion and the second velocity is a reverse motion.

19. The improved machine of claim 18 wherein the first velocity is a forward motion and the second velocity is a reverse motion.

20. An improved ice cream machine including a tank for mixing and freezing the ice cream, the improvement comprising:
at least one motor for mixing the ice cream in the tank at a first velocity and for mixing semi-solid or solid inclusions at a second velocity wherein the first velocity is a forward speed and the second velocity is a reverse speed, wherein the solid or semi-solid inclusions enter the tank through an aperture near an output of the tank.

* * * * *

UNITED STATES PATENT AND TRADEMARK OFFICE
CERTIFICATE OF CORRECTION

PATENT NO. : 7,047,758 B2
APPLICATION NO. : 10/686017
DATED : May 23, 2006
INVENTOR(S) : Harold F. Ross

It is certified that error appears in the above-identified patent and that said Letters Patent is hereby corrected as shown below:

Column 10, line 2, replace "wade" with --grade--.

Column 10, line 10, replace "die" with --the--.

Signed and Sealed this

Twelfth Day of September, 2006

JON W. DUDAS
*Director of the United States Patent and Trademark Office*